Nov. 15, 1949     O. WITTEL     2,487,913
LENS SUPPORTING AND FOCUSING MECHANISM
FOR MOTION-PICTURE CAMERAS
Filed April 3, 1948     3 Sheets-Sheet 1
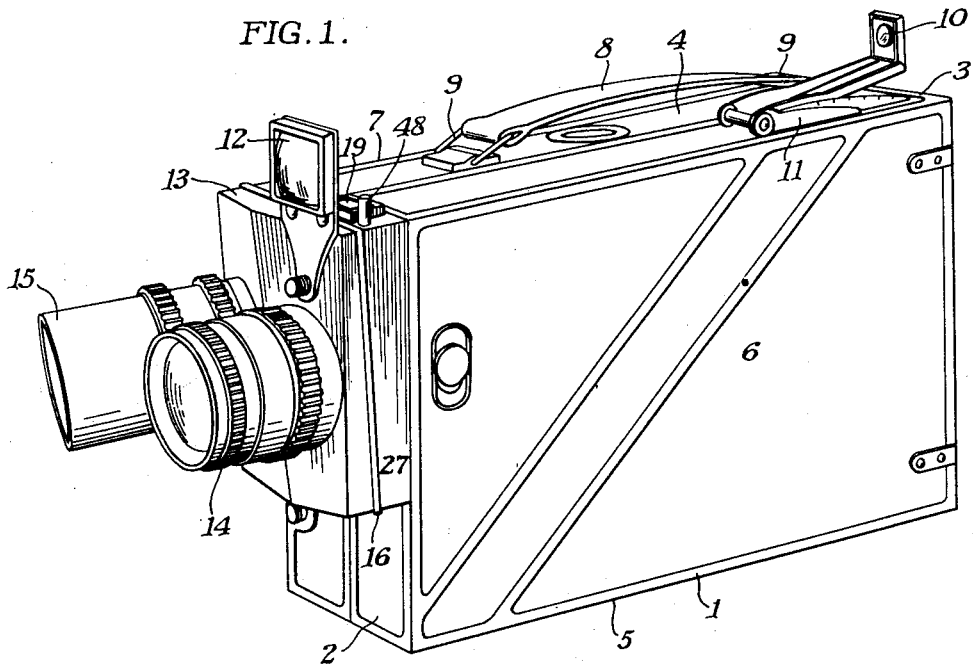
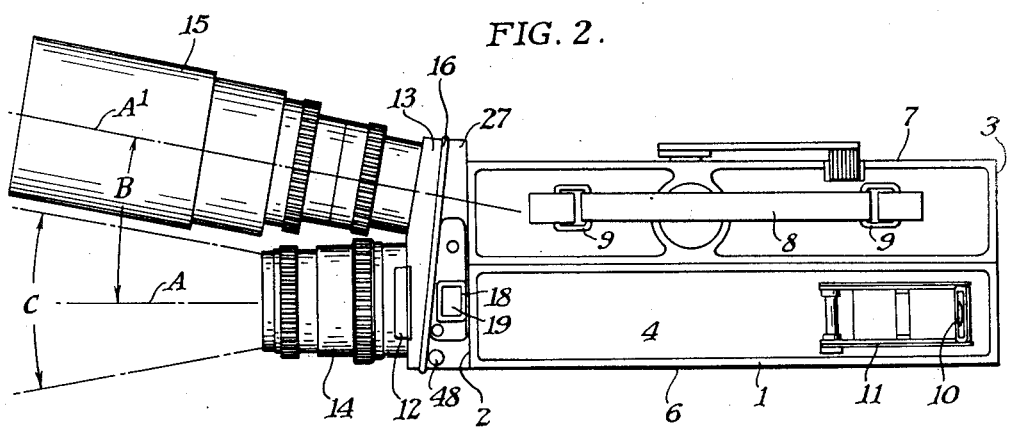
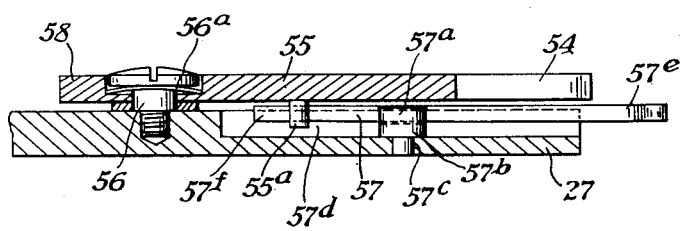
OTTO WITTEL
INVENTOR
BY
ATTORNEYS Nov. 15, 1949 O. WITTEL 2,487,913
LENS SUPPORTING AND FOCUSING MECHANISM
FOR MOTION-PICTURE CAMERAS
Filed April 3, 1948 3 Sheets-Sheet 3
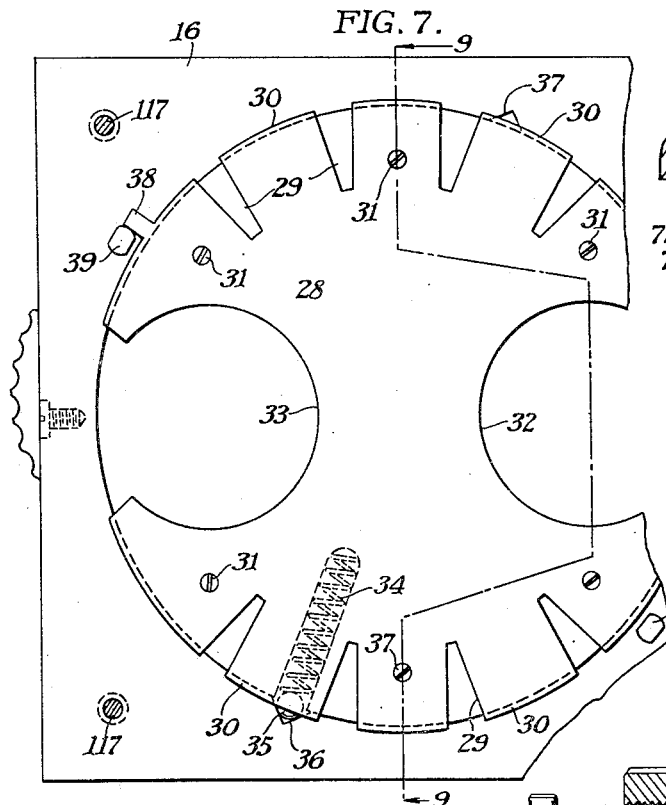
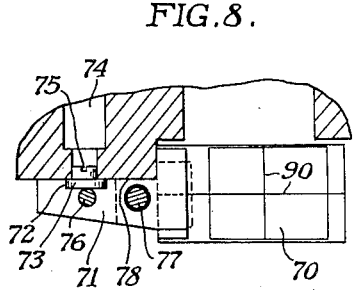
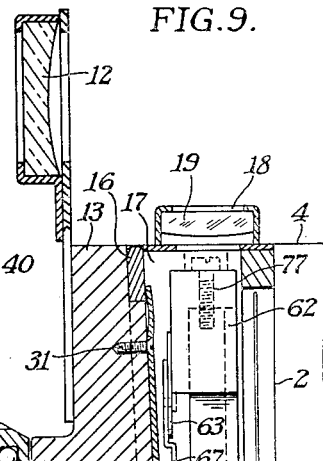
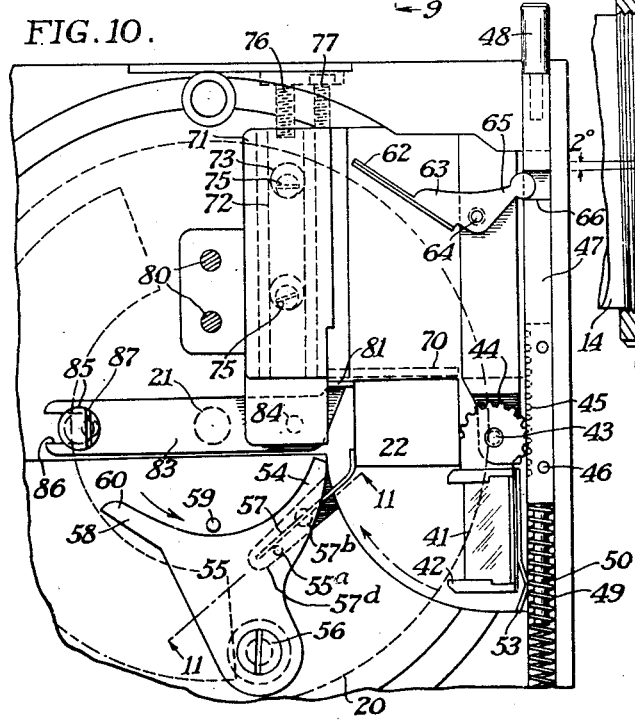
OTTO WITTEL
INVENTOR
BY
ATTORNEYS Patented Nov. 15, 1949

2,487,913

UNITED STATES PATENT OFFICE 2,487,913

LENS SUPPORTING AND FOCUSING MECHANISM FOR MOTION-PICTURE CAMERAS

Otto Wittel, Rochester, N. Y., assignor to Eastman Kodak Company, Rochester, N. Y., a corporation of New Jersey Application April 3, 1948, Serial No. 18,794

5 Claims. (Cl. 95—44)

1

This invention relates to photography and more particularly to a lens supporting and focusing mechanism for motion picture cameras. One object of my invention is to provide a focusing mechanism with which an image formed by a lens may be visually focused. Another object of my invention is to provide a lens turret so arranged that either lens on the turret may be made to cooperate with the visual focusing mechanism. A still further object of my invention is to provide a lens turret mounted to turn on a camera wall which is angularly disposed so that a lens of long focal length will lie outside of the field of a lens of short focal length. A still further object of my invention is to provide a turret and focusing mechanism so arranged that there is a narrow focusing chamber lying between that part of the turret which is spaced farthest from the camera body and the shutter. An additional feature of my invention is to provide a focusing mechanism with a movable mirror which may be swung to and from an operative position behind an objective and which may be automatically moved from its operative position by means of the camera shutter. Other objects will appear from the following specification, the novel features being particularly pointed out in the claims at the end thereof.

In motion picture cameras for the more serious type of work it is customary for photographers to focus certain scenes (particularly nearby scenes) on the ground glass to be sure of proper focus and proper location of the image being photographed on the film frame. Many 35- and 16-mm. cameras are equipped with some form of focusing mechanism. However, with 16-mm. and smaller cameras it is difficult to apply focusing mechanism because the room between the rear lens of the objective and the shutter which must of necessity lie close to the film gate, is extremely restricted. Moreover, it is particularly difficult where different lenses are applied to a lens turret so that different lenses may be moved into an operative position to make photographs.

I have found that a number of advantages can be obtained by providing a front camera wall at an angle to the normal front wall of a camera, so that the plane of the front wall will be angularly disposed with respect to the axis passing through an exposure frame. The angle of this wall and the angle of the mating wall of the turret may be arranged so that the lens turret axis is offset from the axis of the exposure frame in two directions. It may be offset from the top to the bottom of the camera by a comparatively

2 small amount such as 2° and it may be offset from side to side of the camera a somewhat larger amount such as 6°, for by so selecting the plane on which the lens turret may be turned, two advantages are obtained. First, this arrangement provides a narrow chamber between the shutter and the lens turret extending to the exterior of the camera which is wide enough to receive focusing mechanism which includes a number of movable parts. Second, it permits the axes of the two objectives to be carried by the turret to be offset one from the other a material amount as, for instance, 12° so that the lens barrel of a long focal length lens may lie totally outside of the field of view of a short focal length lens. Of course, the length of the longer lens barrel is used to determine the angular relationship of the two objectives. However, with a normal focal length objective of approximately 15 mm. and a long focal length object of approximately 6 inches, the divergence between the axes of the two objectives may be in the neighborhood of 12° although this figure is, of course, cited only by way of example, and would be varied for different sized cameras and objectives of different focal lengths.

Coming now to the drawings wherein like reference characters denote like parts throughout:

Fig. 1 is a perspective view of a motion picture camera equipped with a lens supporting and focusing mechanism constructed in accordance with and embodying a preferred form of my invention.

Fig. 2 is a top plan view of the motion picture camera shown in Fig. 1, this view showing a typical divergence of the lens axis for a long and normal focal length lens.

Fig. 7 is a fragmentary view showing a portion of the connection between the turret and the front wall of the camera the parts being shown in elevation.

Fig. 8 is a fragmentary sectional view showing a portion of the focusing screen mount, approximately on line 8—8 of Fig. 4.

Fig. 9 is a section on line 9—9 of Fig. 7 also taken through a portion of the lens turret.

Fig. 10 is a fragmentary detail view showing in elevation portions of the focusing mechanism moved to an inoperative position but otherwise similar to portions of Fig. 4 which shows parts of the focusing mechanism in an operating position.

Fig. 11 is a section on line 11—11 of Fig. 10.

Figure 3:
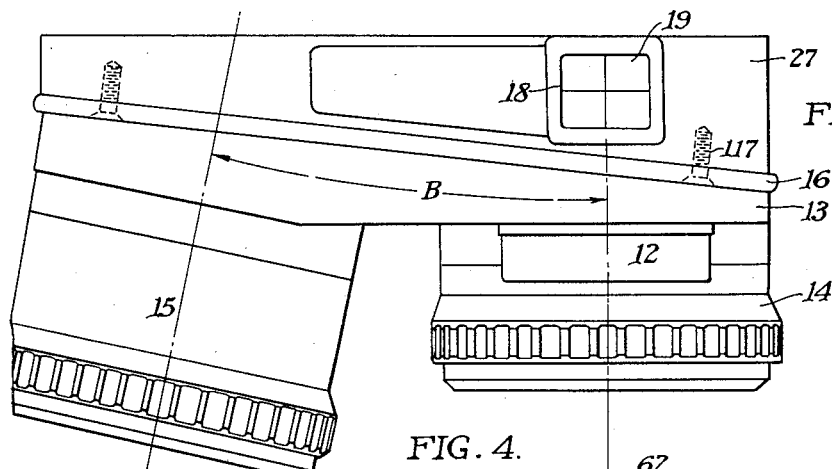
Fig. 3 is a fragmentary top plan view showing a portion of a lens turret and focusing mechanism as used on the camera in the preceding views.

My invention consists in providing a lens turret and a front camera wall turning on a plate arranged at an angle to the front wall of a camera so that a space is provided between the turret and the front wall of the camera for a focusing mechanism, parts of which are movable, and so that long and short focal length lenses may be carried by a turret movably mounted on said wall without interference. Thus, either lens of the turret may be brought into axial line with a film aperture permitting manual focus of either object upon a ground glass screen.

Referring to Fig. 1, a motion picture camera designated broadly as 1 is indicated as being provided with a front wall 2, rear wall 3, top wall 4, bottom wall 5, and side walls 6 and 7. Such cameras are known and may be conveniently made rectangular in shape as shown in the drawing. On the top wall 4 there may be mounted a handle 8 carried by supports 9 and there may be a view finder element 10 attached to a support 11 carried by the top wall 4, this view finder element cooperating with a front view finder element 12 which may be attached to a lens turret 13. The lens turret 13 may carry objectives 14 and 15, which, as best shown in Fig. 2, may have their axes A and A—1 arranged at an angle because of the shape of the lens turret 13, and its mounting plate angle. Thus, the lens 14 may include a field of view indicated by C in Fig. 2, and since the lens axes A and A—1 are angularly spaced apart through an angle B, the objective 15 will lie totally outside of the field of view indicated by the line C. In the present instance, the angle B between the axes of the two objectives may be 12° since this angle takes care of the shortest and longest focal length lens made for the particular camera shown. These focal lengths are 15 mm. and 6 inches. These figures, of course, are only by way of example.

It should be noticed from Fig. 2 that while the front wall 2 of the camera lies in one plane, the plate 16 on which the lens turret 13 turns lies in a different plane and one which is offset from the front wall 2. It should be noticed that the plate 16 is spaced farthest from the wall 2 above the axis A of the objective 14. The objective 14 in this view is the objective which is in an operative or picture-taking position. It should also be noted from Fig. 9 that the plane of wall 16 would intersect the plane of the wall 2 well below the camera, the plane of the two walls in this direction in the present instance are offset by an angle of 2°. The reason for this is evident from Fig. 9 wherein it is indicated that a narrow chamber 17 extends upward from the axis A to the exterior of the wall 4 of the camera to provide a view opening 18 which in this instance lies over the top of a viewing lens 19. Thus, the greatest space between the turret and the front wall of the camera is utilized for the focusing mechanism even though the rear lens element L of an objective may come relatively close to a shutter blade 20 which may be turned by a power-driven shaft 21 and which must lie close to the exposure frame 22 behind which there is a presser member 23 forming the usual type of film gate.

In some cameras the film gate may form a part of a film magazine which is inserted into an exposure position in the camera, and in other cameras the film gate may be mounted upon a camera wall, this type being a camera where film on film spools is used. Both types of cameras are well known.

The objectives 14 and 15 are mounted on a lens turret 13 in any desired manner and they may be attached as indicated in Fig. 9 by means of a threaded area 24 carried by the lens mount 14 engaging a threaded ring 25 which may be carried by a shouldered sleeve 26 forming a part of the lens turret 13. For the specific construction of this attaching mechanism reference may be had to my copending application Ser. No. 933, filed January 7, 1948, Camera Lens Attaching and Clamping Mechanism. The details of this construction form no part of the present invention.

The lens turret 13 as best shown in Fig. 9 is attached to a supplemental camera wall 27 by mans of a plate 28 best shown in Fig. 7, this plate being provided with a series of slots 29 to provide spring fingers 30, these spring fingers as shown in Fig. 9 frictionally pressing upon the ring 16 which is attached by screws 117 to the camera wall 27. These engaging rings provide a turntable on which the turret may turn smoothly because of the friction of the spring fingers. The plate 28 is attached to the lens turret 13 by means of screws 31, Fig. 7, and there are apertures 32, 33 in the plate through which the rear parts of the lens barrels 14 and 15 may project. Beneath the plate 28 there is a coiled spring 34 thrusting a ball 35 outwardly and into one or the other of two V-shaped notches 36 and 37. These definitely lock the lens turret in position so that one or the other of the objectives 14 and 15 are in a picture-taking or operative position. The plate 28 also includes a projecting lug 38 which by striking one or the other of stop pins 39 or 40 confines the possible rotation of the plate 28 to 180° rather than letting this plate turn through 360° since in this way somewhat more clearance is permitted for the focusing mechanism chamber 17.

Figures 4, 5:
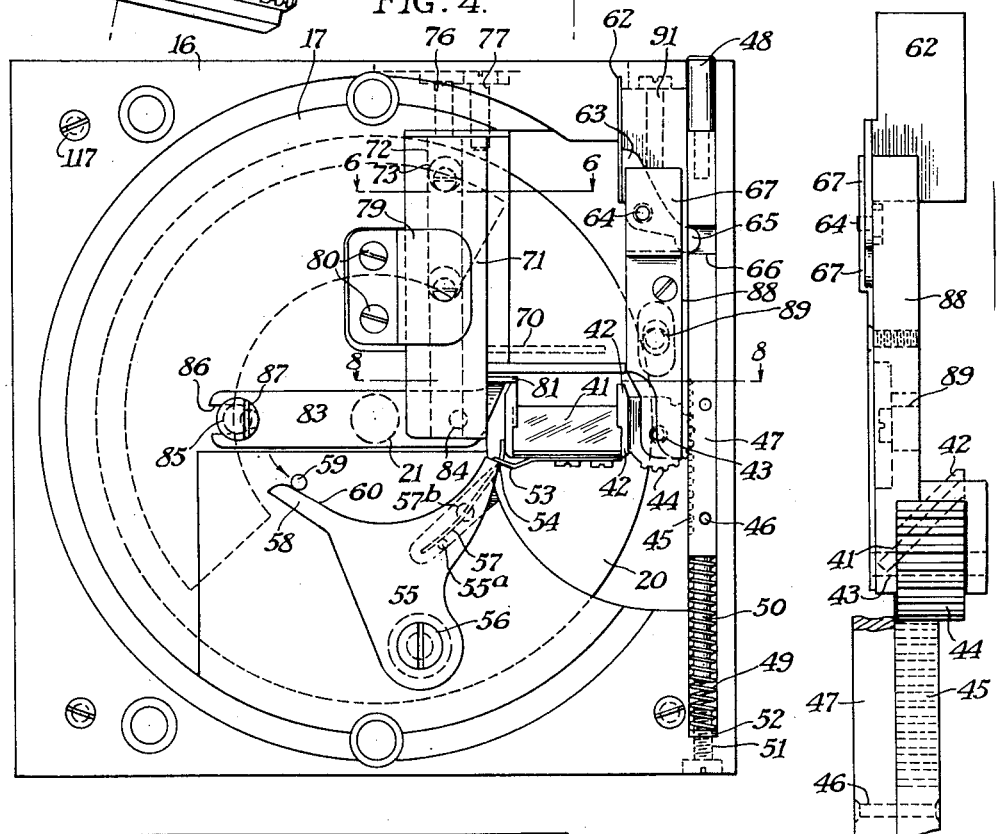
Fig. 4 is an elevation of the front wall of the camera showing the arrangement of the focusing mechanism with the turret arrangement.
Fig. 5 is an enlarged fragmentary view of a portion of the focusing mechanism shown in Fig. 4, in side elevation.
Figure 6:
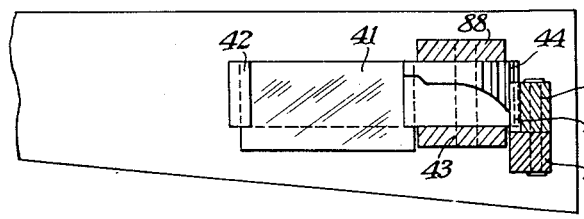
Fig. 6 is a fragmentary plan view of a detail partially in section showing a portion of the mirror-operating mechanism.

In 16-mm. cameras some objectives include lenses lying very close to the camera shutter 20 and close to the film gate 22—23. Lens L Fig. 9 illustrates this relationship. Some long-focus objectives have their nodal points so positioned that the rear lens lies close to the gate. But in any event the space, even without a lens turret, is extremely restricted so that it is difficult to apply a focusing machanism to the turret-type of camera. By offsetting or angularly arranging the plane of the turret, room is gained for the chamber 17. This chamber includes focusing mechanism best shown in Figs. 4 and 9. Referring to Fig. 4, a mirror 41 may be carried in a frame 42 which is pivotally supported at 43, this frame carrying a gear segment 44. The gear segment meshes with a rack 45 which may be attached to plunger 47, as by rivets 46, or which may form a part of the plunger 47. This plunger extends in a suitable guide way in the camera wall and is provided at the top with a push button 48 for manually moving the plunger against pressure of a spring 49 which encircles the reduced end 50 of the plunger. The screw 51 in a threaded opening 52 permits the tension on the spring 49 to be adjusted in assembling.

When the push button 48 is depressed the rack 45 and gear segment 44 will swing the mirror 41 upward from its position in Fig. 10 to its position in Fig. 4 which is its operative position on the axis A of the camera objective. In this position a latching element 53 engages a latching element 54 which is formed on an arm of a lever 55 pivotally mounted on a stud 56 and normally pressed by a spring 57 into its latching position as shown in Fig. 4. Lever 55 includes an arm 58 lying in the path of a pin 59 carried by the camera shutter 20. When the camera shutter 20 is rotated by its power-driven shaft 21, the pin 59 strikes the cam surface 60 moving the latch element 54 away from the latch element 53 and permitting the spring 49 to move the plunger 47 upward and the mirror downward to its Fig. 10 position. In this position the mirror is inoperative and lies outside of the field of the objective.

Movable with the plunger 47 is a shutter member 62 which is carried by an arm 63 pivotally mounted at 64 and having an arm 65 engaging a shoulder 66 in the plunger 47. A spring member 67 serves to retain the pivot 64. Consequently when the push button 48 is moved downward to its Fig. 4 position, the shutter member 62 moves upward to its inoperative position as shown in Fig. 4 so that an image on the ground glass 70 may be viewed by looking downward through an eyepiece 19.

However, when the push button 48 is released by the shutter pin 59, releasing the latch 53—54, the spring 49 not only moves the mirror 41 to its inoperative position in Fig. 10, but it likewise swings the cover member 62 across the viewing opening so as to prevent light from passing downward through an eyepiece 19 to the ground glass 70 through which some light might possibly be reflected to the film gate 22—23. Thus, the shutter member 62 is moved in timed relation to the mirror 41 and will open the viewing passage when the mirror 41 is moved to an operative position and will also close the viewing aperture when the viewing mirror is swung down into its inoperative position of Fig. 10.

In order to keep the pin 59 from striking cam arm 60 at each revolution when the camera is being operated, spring 57 is mounted as a spring lever. Spring 57 as shown in Fig. 11 is mounted in the slot of head 57ᵃ of a stud 57ᵇ which stud may freely turn in the hole 57ᶜ. The wall 27 is recessed at 57ᵈ for the spring. One end 57ᵉ of the spring lies in the path of the mirror frame 42 and the other end 57ᶠ rests against a pin 55ᵃ projecting down into the recess 57ᵈ where the spring end 57ᶠ may rest against the pin. A friction washer 56ᵃ lies between lever 55 and wall 20 tending to hold lever 55 in any position but permitting movement thereof. When in the Fig. 10 position pin 59 may swing around the cam arm 60 and arm 54 moving close to but out of contact with lever 55. Lever 55 moves to the Fig. 10 position to release latch 53—54, and remains there when mirror 41 swings away from the end 57ᵉ of spring 57. However, when button 48 is pushed down and mirror 41 swings up, as shown in Fig. 4, frame 42 strikes spring end 57ᵉ turning the spring supporting pin 57ᵇ thereby turning lever 55 through spring end 57ᶠ to its latch 53—54 engaging position where it is resiliently held by spring 57. This, of course, positions arm 60 in the path of pin 59 to be actuated thereby at the next actuation of the shutter 20.

For best results it is necessary to adjust these various parts in order properly to condition the camera for making exposures. Referring to Fig. 8 the ground glass 70 may be carried by a slide member 71 having a groove 72 in which the eccentric heads 73 of a pair of adjusting screws may lie so that by passing a screw driver through an aperture 74, the slot 75 of the screw may be engaged to vary the position of the ground glass 70 from side to side. There are also adjusting screws 76 and 77 as best shown in Fig. 4, which may be adjusted to change the elevation of the ground glass and its slide 71. The slide 71 is held against a shoulder 78 by means of the spring bracket 79 as shown in Fig. 4, the shoulder for the slide 71 being shown in Fig. 8. The bracket 79 is attached to a camera wall in any suitable manner as by screws 80.

These adjustments permit the ground glass to be accurately located to correspond with the focal plane of the gate 22—23 after the light rays passing through an objective are reflected by the mirror 41, so that when an object is focused sharply on the ground glass 70 the image will also be accurately focused in the gate 22—23 and on the film lying between these gate members.

The mirror 41 Fig. 4 must be accurately located to reflect light rays passing through an objective to the ground glass. This is accomplished by providing a stop 81 which will locate the mirror frame 42 when latching elements 53 and 54 are engaged. The stop 81 is carried by a lever 83 pivoted at 84 to the camera front and adjustable by means of an eccentric stud 85 which may be mounted in a slot 86 by means of a screw driver and a slot 87. This will definitely position frame 42 on the left hand side referring to Fig. 4, the right hand adjustment consisting of a slide member 88 which can be moved by an eccentric adjusting screw 89 and which may be held against the limiting stop screw 91 so that by adjusting the pivotal point 43 of the mirror and the stop 81, this mirror can be accurately aligned in assembly.

With the lens supporting and focusing mechanisms above described, it is possible to include a focusing mechanism which will produce a full-size image of the view to be photographed on the ground glass screen 70. This will be the same as the view on the film lying in the film gate when the focusing mechanism is moved to an inoperative position. It is preferable to provide the ground glass 70 with cross hairs 90 as shown in Fig. 8 since this enables the object to be carefully centered or otherwise positioned during the focusing operation. By tilting the plane on which the lens turret moves in two directions it is possible to obtain a narrow chamber 17 extending from the mirror 41 upward to an eyepiece 19 on an exterior wall 4 of the camera, even though this space is quite confined. In addition, by arranging the axes of the objectives at quite an angle, one to the other, it is possible to carry long focus lenses as well as short focus lenses on the camera without any interference with the field of the objective being used.

In operation my improved lens supporting and focusing mechanism is extremely simple. The operator selects the objective he desires by turning the lens turret 13 on a supplemental front camera wall 27 which is angularly disposed with respect to the main front camera wall 2. This turning movement can only take place in one direction because of the lug 38 and the pins 39 and 40. The turret member turns smoothly under the friction of the spring fingers 30 pressing on the ring 16 and when the ball 35 snaps into a recess 36 or 37 the objective is accurately positioned on the axis A of the exposure frame or film gate 22—23. As above explained, this exposure frame or film gate may either be built into the camera as when roll film is used, or it may lie wholly or partially in the front of a magazine where film magazines are used. Both these types are well known.

If it is desired to focus the operator merely depresses the push button 48. This lowering of the plunger accomplishes the following functions: the spring 49 is placed under compression; the rack 45 through a gear 44 rotates the mirror 41 (with regard to Fig. 4) in a clockwise direction until the latch elements 53—54 become engaged. During the downward movement of the plunger 47 lever 63 is rocked about its pivot 64 raising the shutter 62 to open the chamber 17 which constitutes a view opening so that an image formed by the objective reflected by the mirror 41 and focused on the ground glass 70 may now be viewed by the eyepiece through a lens 19. The objective may be focused to secure the desired results and it should be noticed that after once pressing down the release button 48, the plunger 47 is held in its lowermost position by means of the latch elements 53—54.

After the selected objective is properly focused and the operator is ready to take pictures, it is only necessary to start the known type of camera mechanism in the usual manner. This causes the camera mechanism to drive the shaft 21 carrying a known type of shutter 20 so that a pin 59 which moves in the direction shown by the arrow in Fig. 4 may then contact with the cam 60 on the lower 55. This tends to rotate lever 55 about its supporting stud 56 against the pressure of spring 57, and immediately disengages the latch elements 53—54. The spring 49 then returns the plunger 47 upward with respect to Fig. 4 to again thrust the push button 48 outward and to restore the parts to their Fig. 10 position in which the mirror 41 is rotated out of the beam of light normally passing from the objective toward the film, and the shutter member 62 is moved to close the sight opening through a narrow chamber 17 leading up to the eyepiece 19.

I have found that there is very little chance of light leaking in through the eyepiece 19 and about the shutter 62 and back to the film 22—23 when the shutter 62 substantially covers the sight opening, and have accordingly omitted light-tight packing between shutter 62 and the walls of the light opening because I have found them unnecessary. Some camera constructions may require known types of light sealing edges between the shutter 62 and the walls of the sight opening.

While it has taken some time to describe the use of my improved form of lens supporting and focusing mechanism for cameras, actually this apparatus can be operated with extreme rapidity since the only operation necessary for focusing is the initial depression of the push button 48. The release of this push button is completely automatic and the selection of the lens can be quickly made particularly as it is customary to utilize one type of lens for one type of operator. However, with this turret mechanism either of the lenses carried by the turret can be quickly brought into alignment with the focusing mechanism as above described.

What I claim and desire to secure by Letters Patent of the United States is:

1. In a motion picture camera lens supporting and focusing mechanism, the combination with a generally rectangular camera body including a front wall, side walls, top and bottom walls, an extension on the front wall having an angular surface lying in a plane which would intersect the front wall below the bottom of the front wall and which would intersect the front wall to one side of a side wall, said angular surface movably supporting a turret to move about an axis normal to the angular surface, a film gate, a narrow chamber between the angular surface and film gate to receive a focusing mechanism including a mirror movable to and from an operative position in front of the film gate, said movable support for the turret comprising overlapping circular flanges and spring fingers carried by one circular flange resiliently pressing on the other circular flange to provide friction between the flanges, said turret being movable to position a lens on the axis of the film gate, whereby the focusing mechanism may be used by moving the mirror to its operative position between the turret and the film gate.

2. In motion picture camera lens supporting and focusing mechanism, the combination with a generally rectangular camera body including a front wall, side walls, top and bottom walls, an extension on the front wall having an angular surface lying in a plane which would intersect the front wall below the bottom of the front wall and which would intersect the front wall to one side of a side wall, said angular surface movably supporting a turret to move about an axis normal to the angular surface, a film gate, a narrow chamber between the angular surface and film gate to receive a focusing mechanism including a mirror movable to-and-from an operative position in front of the film gate, said movable support for the turret comprising overlapping circular flanges and spring fingers carried by one circular flange resiliently pressing on the other circular flange to provide friction between the flanges, one circular flange lying in an offset plane from the front wall of the camera, and providing a circular track on which the turret may turn, said spring fingers pressing against said circular track also holding the turret on the front wall of the camera, as well as thrusting the turret thereagainst.

3. In a motion picture camera lens supporting and focusing mechanism, the combination with a generally rectangular camera body including a front wall, side walls, top and bottom walls, an extension on the front wall having an angular surface lying in a plane which would intersect the front wall below the bottom of the front wall and which would intersect the front wall to one side of a side wall, said angular surface movably supporting a turret to move about an axis normal to the angular surface, a film gate, a narrow chamber between the angular surface and film gate extending upwardly from a position in front of the film gate through the top wall of the camera to receive a focusing mechanism including a pivoted mirror, a gear segment carried by the mirror, a ground glass located above the mirror, a notched plunger normally spring-pressed outwardly and extending above and through the top wall of the camera, a rack on the plunger engaging the gear segment, a hinged shutter for extending across the narrow chamber, an arm carried by the shutter and engaging the notch in the plunger to be moved thereby, whereby manual depression of the plunger may move it axially so that the mirror may be moved through its gear segment by the rack on the plunger and into an operative position in front of the exposure frame, and whereby the shutter may be moved through axial movement of the plunger to an inoperative position in which an object may be viewed on the ground glass when reflected by the mirror to define the field of view thereon.

4. In a motion picture camera lens supporting and focusing mechanism, the combination with a camera body including a front, back, side, top, and bottom walls, an exposure frame, means for supporting an objective, a gate for supporting a film in axial alignment with the objective, a shutter between the gate and objective, a focusing mechanism including a movable mirror between the objective and gate, said movable mirror having an operative focusing position and an inoperative picture-taking position, means for automatically moving the mirror to an inoperative position through movement of the camera shutter, a latch element on the camera, a latch element on the mirror, the latch elements holding the mirror in an operative focusing position, and means operable through movement of the mirror towards an operative position for operatively positioning the latch in the camera body for engagement with the latch on the mirror, said means comprising a spring projecting into the path of the mirror, a pivotal mount for the spring, said spring pressing against and turning the latch element carried by the camera when the mirror moving to an operative focusing position engages an end of the spring lying in the path of movement of the mirror.

5. In a motion picture camera lens supporting and focusing mechanism, the combination with a camera body including a front, back, side, top, and bottom walls, an exposure frame, means for supporting an objective, a gate for supporting a film in axial alignment with the objective, a shutter between the gate and objective, a focusing mechanism including a movable mirror between the objective and gate, said movable mirror having an operative focusing position and an inoperative picture-taking position, means for automatically moving the mirror to an inoperative position through movement of the camera shutter, a latch element on the camera, a latch element on the mirror, the latch elements holding the mirror in an operative focusing position, and means operable through movement of the mirror towards an operative position for operatively positioning the latch in the camera body for engagement with the latch on the mirror, said means comprising a spring projecting into the path of a mirror, a pivotal mount for the spring, said spring pressing against and turning the latch element carried by the camera when the mirror moving to an operative focusing position engages an end of the spring lying in the path of movement of the mirror, the camera body including an aperture extending parallel to a side wall of the camera and up through the top wall of the camera, a plunger mounted in said aperture and spring-pressed upwardly, a rack carried by the plunger, a gear segment carried by the pivoted mirror and meshing with the rack, a notch in the plunger, an arm carried by the shutter and engaging the notch, whereby the release of said latch elements holding the mirror in operative position may permit said plunger through the operation of said spring to simultaneously move the mirror to an inoperative position and the shutter to an operative position to exclude light from the film gate.

OTTO WITTEL.

REFERENCES CITED

The following references are of record in the file of this patent:

UNITED STATES PATENTS

| Number | Name | Date |
|---|---|---|
| 1,984,103 | Wittel | Dec. 11, 1934 |

FOREIGN PATENTS

| Number | Country | Date |
|---|---|---|
| 434,187 | Great Britain | Aug. 27, 1935 |